June 4, 1940.  C. S. EVANS  2,203,084
FIBERBOARD STRUCTURE AND METHOD OF MAKING THE SAME
Filed March 17, 1938  3 Sheets-Sheet 1

INVENTOR
Charles S. Evans

June 4, 1940.   C. S. EVANS   2,203,084
FIBERBOARD STRUCTURE AND METHOD OF MAKING THE SAME
Filed March 17, 1938   3 Sheets-Sheet 2
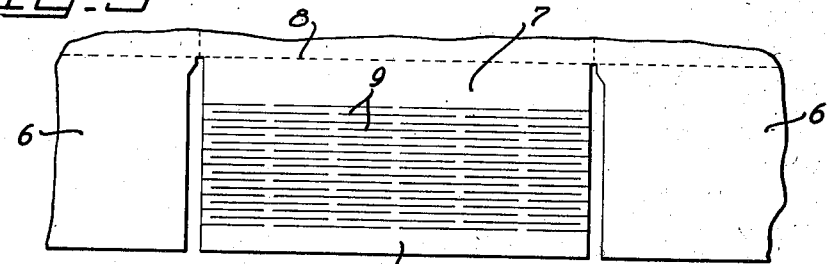
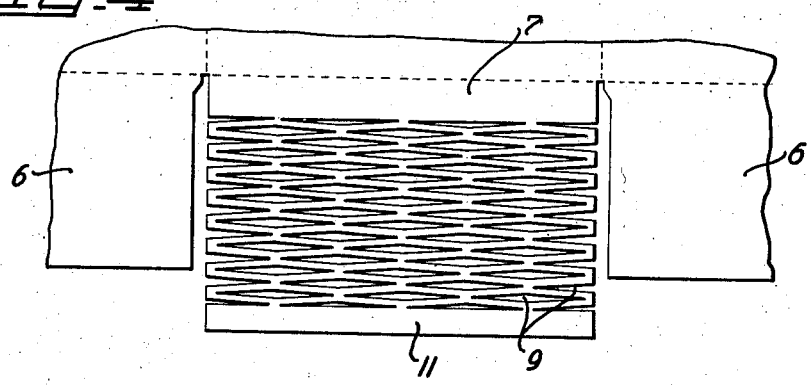
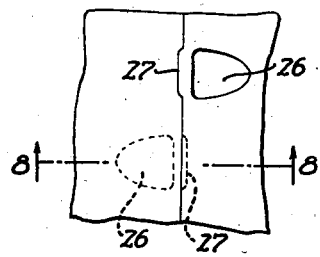
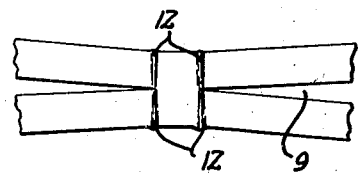
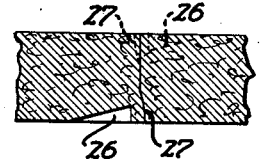
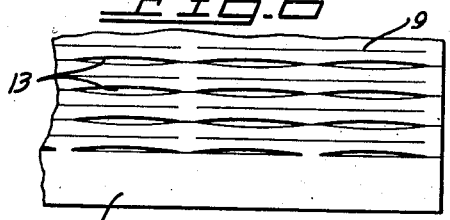
INVENTOR
Charles S. Evans June 4, 1940.  C. S. EVANS  2,203,084
FIBERBOARD STRUCTURE AND METHOD OF MAKING THE SAME
Filed March 17, 1938   3 Sheets-Sheet 3
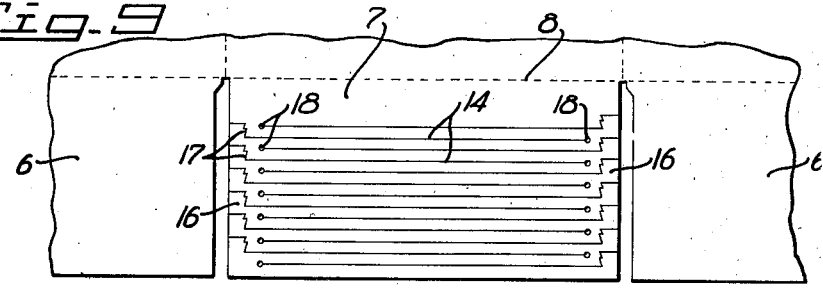
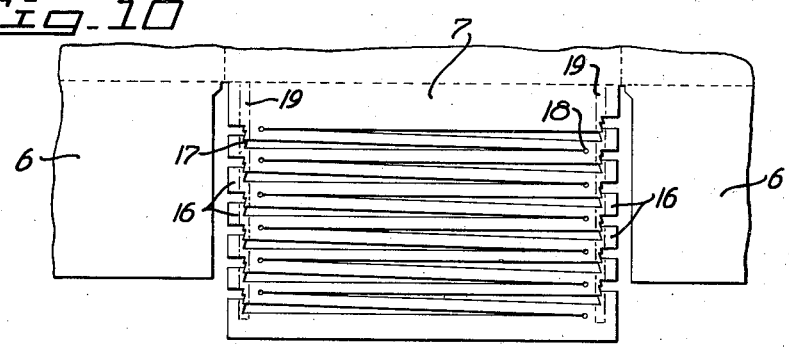
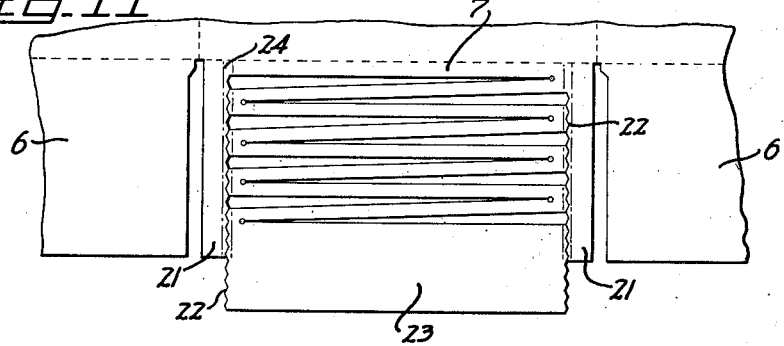
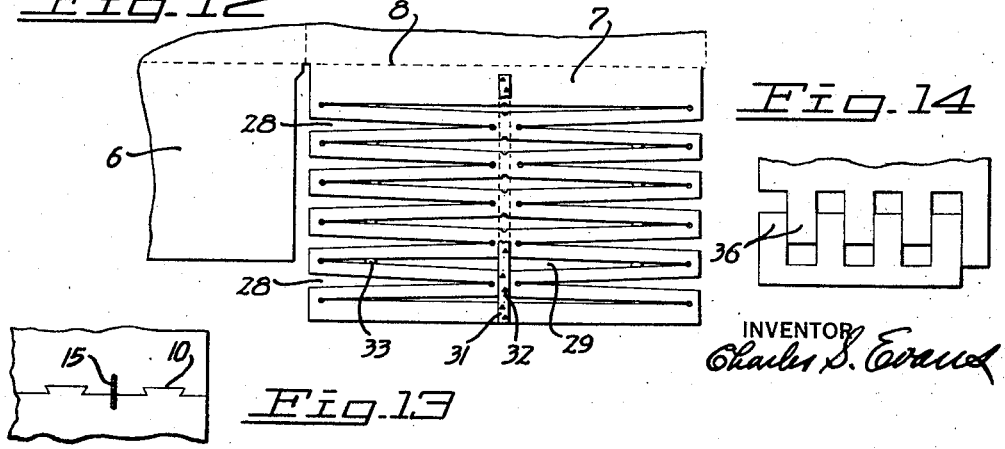
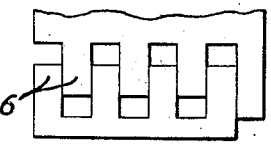
INVENTOR
Charles S. Evans Patented June 4, 1940

2,203,084

UNITED STATES PATENT OFFICE 2,203,084

FIBERBOARD STRUCTURE AND METHOD OF MAKING THE SAME

Charles S. Evans, Oakland, Calif., assignor to Fibreboard Products Inc., San Francisco, Calif., a corporation of Delaware Application March 17, 1938, Serial No. 196,311

8 Claims. (Cl. 229—37)

My invention relates to the manufacture of fiberboard structures, such as cartons; and the broad object of the invention is to provide a structure and method for extending a panel or sheet of fiberboard over an area greater than it normally occupies.

Another object of the invention is to provide an expandible panel adapted to extend into a space or gap adjacent the panel.

Another object of the invention is to provide such a panel or flap in a carton having a pair of narrow flaps normally leaving a gap therebetween, so that one or both of the flaps may be extended into the gap to provide a level-bottom carton.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figures 3 and 4 are plan views of the narrow flaps on larger scale than Figures 1 and 2, showing the flaps before and after expansion; and Figure 5 is a detail view on still larger scale showing the interconnecting strips.

Figure 6 is a fragmentary plan view showing a modified form of cut before expansion.

Figure 7 is an enlarged detail plan view showing a method of interlocking expanded parts; and Figure 8 is a section of the same taken in a plane indicated by line 8—8 of Figure 7.

Figure 9 is a plan view of the narrow flap, showing another arrangement of cuts in the flap for extending it; and Figure 10 is a similar view of the same showing the flap extended.

Figures 11 and 12 also show extended flaps and further illustrate modified forms of construction.

Figure 13 shows several means for fastening abutting ends of the expanded flaps together.

Figure 14 shows a two-section expandible flap.

In the manufacture of fiberboard products, such as cartons, the cutting of blanks from a parent sheet with a minimum of waste is a principal consideration. For this reason the flaps of cartons are often not long enough to meet when the carton is closed, thus leaving gaps therebetween. These gaps at the top and bottom of the carton are highly undesirable since they leave uneven surfaces and cause cans or other containers therein to tilt against each other, resulting in rim dents, scuffed labels and damage to contents.

One method of overcoming this defect and providing a level bottom is to place a pad in the gap between the tabs. While this method accomplishes the desired result, it requires extra material. In my improved carton the tabs are all the same length when the blank is cut from a parent sheet, and then the tabs are extended into the gap by expanding them. By this method the gap is filled to provide a level-bottom carton without use of any extra material.

In terms of broad inclusion, the fiberboard structure embodying my invention comprises a panel normally extending over a predetermined area and having partially severed portions spread apart to extend the panel over a greater area. By this structure the flap or panel of a carton may be extended into a gap to provide a level bottom. While the production of level-bottom cartons is one application of my invention, it is understood that the principles involved are applicable to any fiberboard structure where it is desired to extend a panel over an area greater than it would normally occupy.

Figure 1:
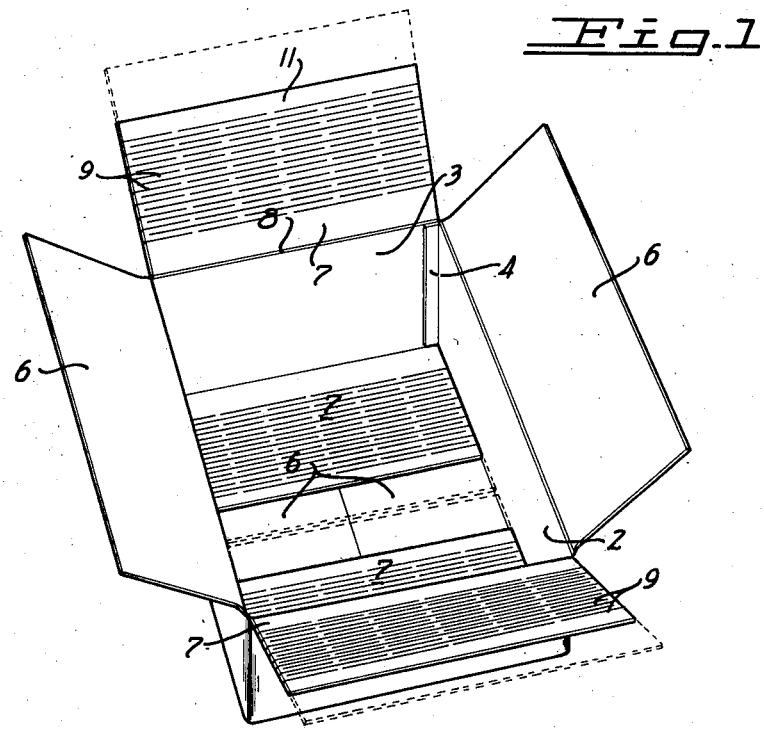
Figure 1 is a perspective view of a carton embodying the improvements of my invention, the extended positions of the narrow flaps being indicated by dotted lines.
Figure 2:
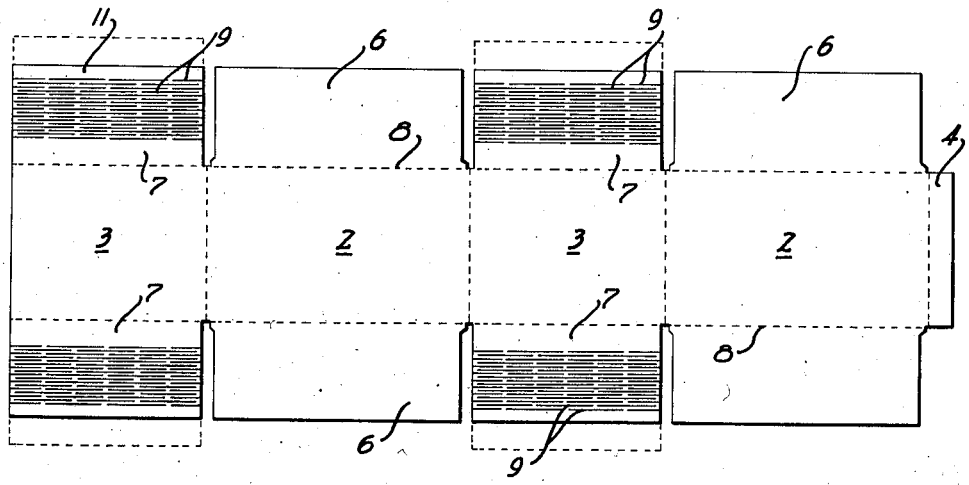
Figure 2 is a plan view of the blank from which the carton is folded, the extended positions of the expandible narrow flaps being indicated by dotted lines.

In greater detail and referring to Figures 1 and 2 of the drawings, a carton having expandible flaps embodying my invention comprises side walls 2 and end walls 3, the side walls being longer than the end walls. A tab 4 is provided along an end edge of one side wall for fastening it to an adjacent end wall, as by stapling or gluing, when the carton is set up. Flaps or panels 6 are provided along opposite edges of the side walls, and similar flaps 7 are provided on the edges of the end walls. These flaps fold inwardly along creases 8 to form the top and bottom walls of the carton, in the usual manner.

As shown in Figure 2, the blank from which the carton is folded is generally rectangular in shape so that it may be cut from a parent sheet of material, such as fiberboard, with minimum waste. By fiberboard I mean the fibrous sheet materials, either plain or corrugated, used for making cartons. Flaps 6 and 7 are all of the same length and this length is preferably equal to one-half the width of end wall 3 so that the wider side wall flaps meet to completely close the carton. The narrower end wall flaps 7 which fold in first do not meet however and leave a gap therebetween.

This gap at the bottom of the carton is bad because it makes an uneven surface, causing cans or other packaged articles to tilt against each other, and resulting in rim dents and scuffed labels. To avoid these gaps, without changing the shape of the blank or employing extra material, I make the end wall flaps 7 expandible so that they may be extended to fill the gap. The dotted lines in Figures 1 and 2 show the extended positions of the tabs.

I have shown several arrangements of cuts in the flaps for expanding them. Figures 1 to 4 show an arrangement in which the flap is provided with a multiplicity of short cuts 9 arranged in rows with the cuts of one row staggered with respect to cuts in adjacent rows. The rows of cuts are quite close so that the interconnecting strip portions are relatively narrow. The length of cut and spacing between them will vary for different thicknesses of fiberboard. Expansion is effected by grasping the uncut border portion 11 and pulling out the flap; this being done either by mechanical means or by hand. Contrary to the general belief that fiberboard cannot be expanded in this way, I have found that the provision of a sufficient number of closely spaced cuts in the body of a panel, so that each cut is required to open but a small amount, permits the panel to be pulled out. While each opening is relatively small the aggregate of the openings gives the desired total expansion. I find that these cuts open quite uniformly by a direct pull at the border.

As this panel or flap is pulled out the interconnecting strip portions between the cuts spread apart into thin diamond shapes, and when the spreading occurs the strip portions tip but very slightly from the plane of the sheet. The principle of expansion involved here is very different from that of expanded metal, because in the latter the ductility of the metal is relied upon and the strip portions tip up almost at right angles to the plane of the sheet during expansion. Fiberboard has no ductility, and within safe limits the strips spread substantially in the plane of the sheet. If these limits are exceeded the strips twist off. During the initial safe limits of expansion, each strip acts as a beam with bending moments setting up tension and compression stresses. With interconnecting strips of uniform width, as shown in Figures 3 and 4, the stresses are concentrated at the connecting ends causing ridges 12 to be formed. See Figure 5. By thinning the central portions of the strips with curved or other suitable cuts 13 as shown in Figure 6, the stresses may be more uniformly distributed, to eliminate the formation of ridges 12.

A fiberboard panel will not stay in the expanded position, as does expanded metal, but tends to draw back to its original position when the pulling force is released. Means are therefore provided for holding the flap extended. A metal strip such as in the modification shown in Figure 12 may be used for this purpose. Another method is to apply pressure to the expanded flap before the pulling out tension is released, thereby crushing down and relieving the stresses in the fibers to fix the parts in the expanded position. The pulling out force may then be released without the flap returning to its retracted position. There is a slight recovery movement tending to draw back the flap, but this may be compensated for by pulling the flap out further than its final expanded position when the pressure is applied, so that a certain amount of drawing back is allowed.

These latter methods of holding the flaps extended contemplate expanding the flaps at the factory so that the flaps are expanded when the carton blanks are shipped to the purchaser. It is understood however that the flaps may be extended at the time the carton is set up by the user. This has the advantage of keeping the blanks more compact during shipment, but has the disadvantage of requiring the user to expand the tabs. The extension of the tabs however is not difficult in a structure, such as shown in Figures 1 to 4, where expansion is effected by a simple pulling out operation either by hand or with a simple jig.

Where the flaps are expanded at the time the carton is set up, the outer flaps 6 provide a backing to which the expanded inner flaps may be fastened, as by gluing or stapling. If desired means at the abutting ends of the flaps may be provided for holding them together. This means could be formed integrally, as by locking tabs 10, or formed separately, such as a metal staple or clasp 15. See Figure 13. Few extra motions are required of the person setting up the cartons in order to effect the flap extension. Once the flaps are expanded the weight of the cans in the carton tends to further hold the lower flaps extended. Figures 1 and 2 show carton blanks having a multiplicity of cuts, adapted to have the flaps extended by the user; Figure 1 showing the carton set up prior to the extension of the flaps. Both of the narrower bottom wall flaps are preferably made expandible, so that each extends inwardly to fill part of the gap, although the gap could be filled by expanding one flap only. The narrower top wall flaps are also preferably made expandible, so that they fill the gap to provide a level surface in event the carton is turned upside down.

Figures 9 and 10 illustrate an alternate arrangement comprising cuts 14 extending deeply into the body of the flap and disposed so that the cuts alternately project inwardly from opposite edges. The long cuts 14 permit the portions to bend and thereby spread apart in the plane of the panel an appreciable amount without disrupting the fibrous structure. The length of cut here, rather than the multiplicity of cuts, is relied upon to permit expansion, and the interconnecting strips in this case may be somewhat wider than in Figure 4.

The means for holding the partially severed portions in spread condition is preferably formed integrally with the flap, and comprises locking tabs 16 adjacent the outer ends of cuts 14 and having interengaging elements or teeth 17 between an edge of the locking tab and the body of the flap. When a portion of the flap is pulled out the toothed segments provide abutments to hold the portions apart. The teeth are preferably inclined forwardly to allow the portions to pull out easily.

Tabs 16 and cuts 14 are preferably formed by a combined punching and shearing action, the tab being punched first and then the cut formed by a knife mounted on the same head as the punch. Holes 18 are also preferably punched in the flap at the inner ends of cuts 14. These holes aid in preventing tearing at the ends of the cuts and also provide sockets for engagement of suitable fingers of a machine for expanding the flaps. The pulling out fingers preferably act successively to first pull out the outer strip portion, then the next portion, and so on until all have been pulled out. After the flap has been extended glue wheels are preferably run along the lines of engaging teeth to cement the portions together. Any suitable adhesive, such as sodium silicate, may be used. The paths of the glue wheels are indicated by dot and dash lines 19 in Figure 10, and the adhesive from the wheels gather in gobs at the corners and seeps into the cracks by capillary action. This provides an extended flap which has sufficient rigidity for shipment and handling when the carton is set up, it being understood that this structure is designed preferably for expansion with suitable machines at the factory.

Figure 11 shows a modification in which border strips 21 are left at each side of an expandible center section with teeth 22 along the adjacent edges to hold the section expanded. An uncut border portion 23 is also preferably provided along the forward edge of the expandible section section to further enhance the stability of the flap as a whole. Suitable means, such as deposits of glue over the areas indicated at 24, are also preferably provided along the toothed edges between the center section and side strips 21 to unite the structural parts.

Figures 7 and 8 illustrate on a much enlarged scale an alternate method of fastening parts of the fiberboard together, applicable to such structures as shown in Figures 10 and 11, as a substitute for the bands of glue 19. This method comprises displacing portions of the fiberboard along the adjoining edges of the material by a suitable punch. The punch is struck into the surface of the material with a slanting blow directed toward the edge, thus forming a depression 26 and forcing a portion of the material out against the opposing edge to form an interlocking extrusion 27. A similar extrusion is preferably formed on the underside to provide a double interlock.

Figure 12 shows another modified structure having pairs of cuts 28 extending into the flap from opposite edges, and having intermediate cuts 29 lying wholly within the body of the flap. This structure also shows a variant means for holding the flap extended, comprising a metal center strap 31 having barbs 32 riveted through the separated flap portions. As a means for further holding the flap extended and enhancing the rigidity of the structure, gobs 33 of glue may be deposited at the corners of the interconnected strip portions. This glue may be applied by glue rolls or by fingers designed to place the gobs of glue at the desired points.

Figure 14 shows a two-section expandible flap having cuts forming slidably engaging fingers 36. These interengaging fingers permit the outer flap section to be pulled out to expand the flap over a greater area, yet without using extra material.

I claim:

1. A fiberboard structure, a panel normally extending over a predetermined area and having partially severed portions spread apart to extend the panel over a greater area, and means comprising toothed segments formed integrally with said panel for holding the partially severed portions in spread condition.

2. A carton comprising a flap normally having a gap between it and another part of the carton, said flap having partially severed portions spread apart to extend the flap into said gap.

3. A carton comprising a pair of flaps normally having a gap therebetween, said flaps having partially severed portions spread apart to extend the flaps into said gap.

4. A carton comprising a pair of wide flaps, a pair of narrow flaps normally having a gap therebetween, one of said narrow flaps having partially severed portions spread apart to extend the flap into said gap.

5. The method of making a level-bottom carton from a blank having a flap normally leaving a gap between it and another part of the carton when the latter is folded, which comprises partially severing portions in the body of a flap and then spreading the partially severed portions apart to extend the flap into said gap.

6. A carton comprising a flap normally having a gap between it and another part of the carton, said flap having cut portions spread apart to extend the flap into said gap.

7. The method of expanding a fiberboard panel, which comprises cutting the panel to form interconnected strips having a reduced width intermediate the ends of the strips, and then spreading the strips to expand the panel.

8. A carton comprising a flap normally having a gap between it and another part of the carton, said flap having cut portions spread apart to extend the flap into said gap, and means for holding said flap in extended position.

CHARLES S. EVANS.